(12) United States Patent
Abe et al.

(10) Patent No.: US 8,098,131 B2
(45) Date of Patent: Jan. 17, 2012

(54) MOBILE TERMINAL WITH A SHORT-RANGE COMMUNICATION UNIT

(75) Inventors: Yasuhiko Abe, Niiza (JP); Takafumi Nakamura, Hino (JP); Munehisa Tomioka, Hino (JP); Daizo Ichien, Fussa (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1147 days.

(21) Appl. No.: 11/657,757

(22) Filed: Jan. 25, 2007

(65) Prior Publication Data

US 2008/0108323 A1 May 8, 2008

(30) Foreign Application Priority Data

Nov. 7, 2006 (JP) ................ P2006-301754

(51) Int. Cl.
| | |
|---|---|
| G05B 19/00 | (2006.01) |
| G06F 7/00 | (2006.01) |
| G06K 5/00 | (2006.01) |
| G07D 7/00 | (2006.01) |
| G07F 7/12 | (2006.01) |
| G08B 29/00 | (2006.01) |
| G08C 19/00 | (2006.01) |
| H04B 1/00 | (2006.01) |
| H04L 9/32 | (2006.01) |
| H04Q 1/00 | (2006.01) |
| H04M 1/66 | (2006.01) |

(52) U.S. Cl. ............. 340/5.85; 340/5.8; 455/411; 726/4
(58) Field of Classification Search .......... 455/410–411; 340/5.8–5.85, 5.28–5.31, 5.74; 726/3–15, 726/21
See application file for complete search history.

(56) References Cited

FOREIGN PATENT DOCUMENTS

JP 2003-132291 A 5/2003

*Primary Examiner* — Benjamin C Lee
*Assistant Examiner* — Michael T Shannon
(74) *Attorney, Agent, or Firm* — Maschoff Gilmore & Israelsen

(57) ABSTRACT

An information processing apparatus includes a first control unit configured to judge whether or not the information processing apparatus is in a state where a remote lock operation is impossible; an input unit configured to accept input of authentication information in case that the first control unit judges that the information processing apparatus is in a state where the remote lock operation is impossible; an authenticate unit configured to authenticate whether or not the input-accepted authentication information is coincident with previously stored authentication information; and a second control unit configured to prohibit a transmission/reception of data between the information processing apparatus and an information read device disposed adjacent to the information processing apparatus.

6 Claims, 8 Drawing Sheets

FIG. 1A
FIG. 1B
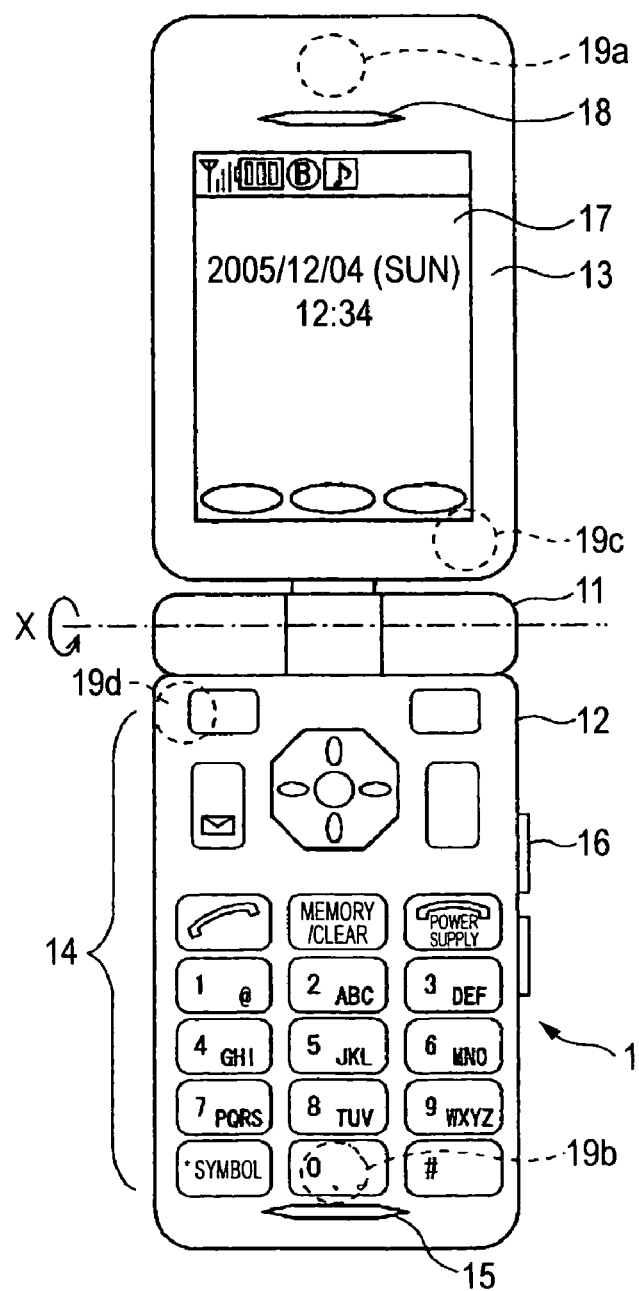
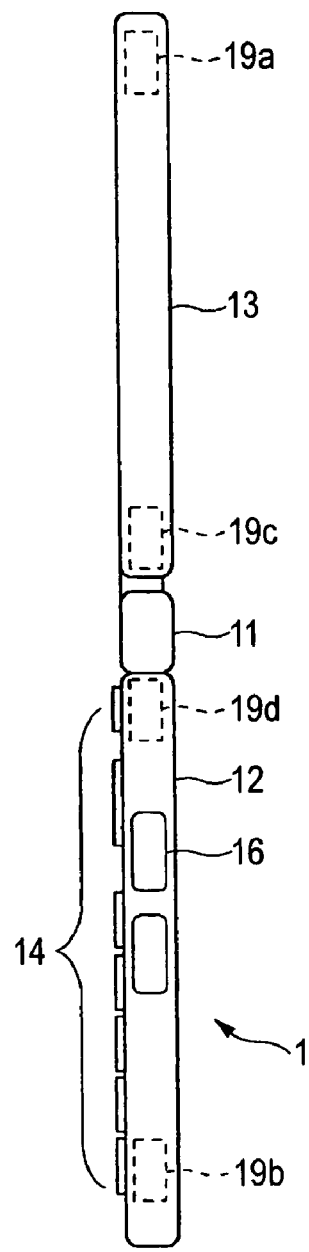

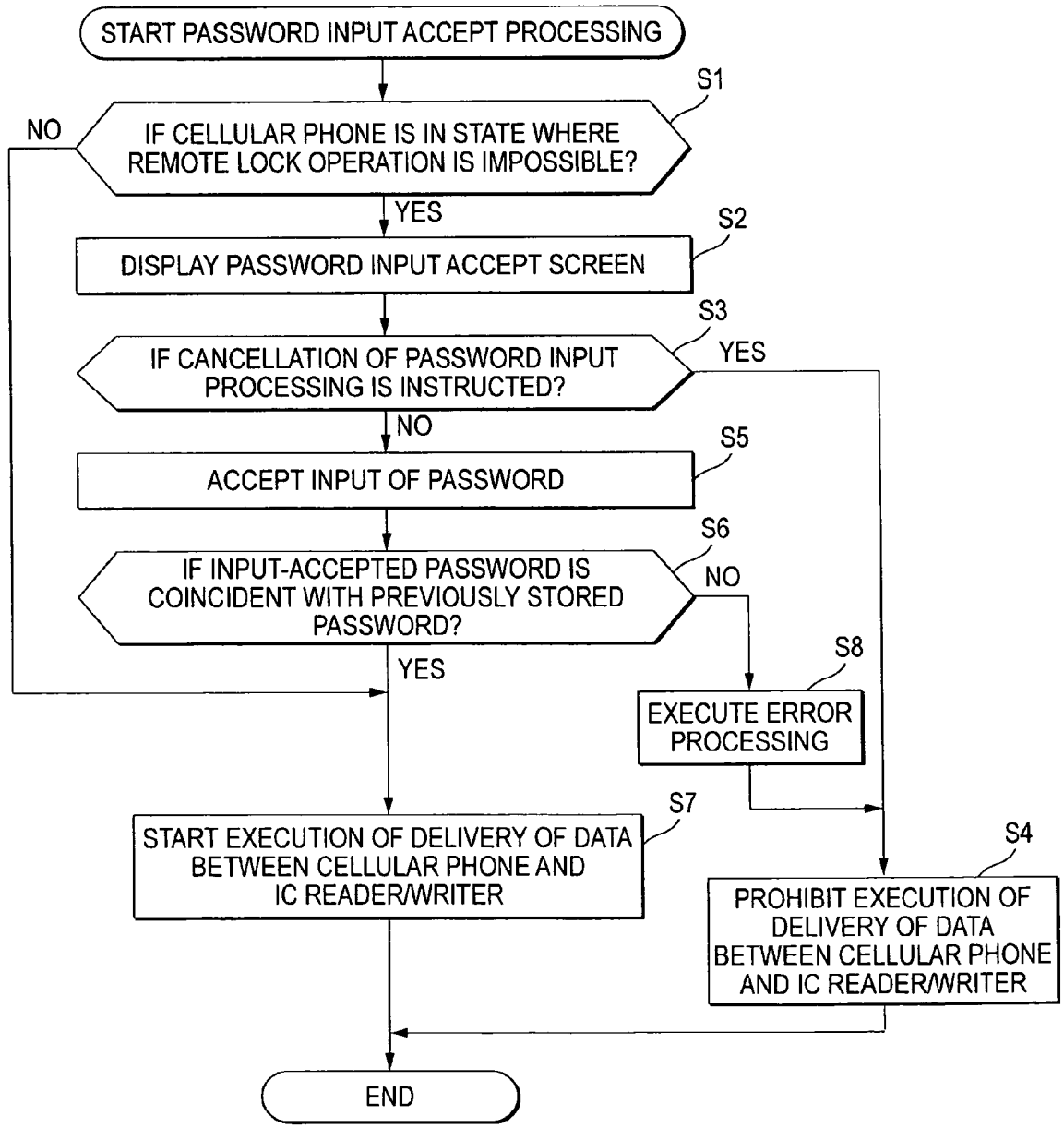

MOBILE TERMINAL WITH A SHORT-RANGE COMMUNICATION UNIT

CROSS-REFERENCE TO RELATED APPLICATIONS

This application is based on and claims the benefit of priority from the prior Japanese Patent Application No. 2006-301754, filed on Nov. 7, 2006; the entire contents of which are incorporated herein by reference.

TECHNICAL FIELD

The present invention relates to an information processing apparatus and, specifically, the invention relates to an information processing apparatus incorporating a contactless IC chip therein.

DESCRIPTION OF RELATED ART

Recently, a cellular phone includes not only a communication function to be fulfilled by a simple talk but also other various functions, for example, an address book function, a mail function to be fulfilled through a network such as an internet, a browser function capable of reading Web pages and the like. Also, the cellular phone further includes an electronic money service function and various authenticate functions using a contactless IC chip (for example, FeliCa chip (a registered trade mark)) incorporated at a given position of the cellular phone.

By the way, when a cellular phone with a built-in contactless IC chip is lost while the user of the cellular phone is unaware of such loss, generally, the user is aware of the loss of the cellular phone for a while later and carries out a remote lock operation or the like on the lost cellular phone to thereby be able to prevent a third party (for example, the finder of the lost cellular phone) from using illegally the cellular phone with the built-in contactless IC chip.

As a technology to prevent a third party from using illegally a cellular phone when it is lost, there is proposed a technology which not only can prevent a third party from using electronic money illegally when a cellular phone is lost but also can get back the balance thereof (for example, see the JP-A-2003-132291).

According to a technology disclosed in JP-A-2003-132291, an electronic money administrative server, in response to an instruction for collection of the electronic money balance of a cellular phone notified of its loss by the user of the cellular phone, gains access to the cellular phone and gives the cellular phone an instruction to take out the electronic money balance thereof. After then, the electronic money administrative server can receive the electronic money balance taken out from the cellular phone and then can pay back the thus received electronic money balance to the user who is the owner of the cellular phone lost. In this manner, when a cellular phone with an electronic money function is lost, immediately after the loss of the cellular phone is reported to a communication business corporation, not only illegal use of the electronic money of the cellular phone by a third party can be prevented but also the money balance of the cellular phone can be collected.

SUMMARY

According to the technology proposed in the above-mentioned related-art, when a cellular phone with an electronic money function is lost, immediately after the loss of the cellular phone is reported to the communication business corporation, the illegal use of the electronic money of the cellular phone by a third party can be prevented and the money balance of the cellular phone can be collected. However, even if the user is aware of the loss of the cellular phone after a while, the cellular phone can be used illegally by a third party (for example, the finder of the cellular phone) before the user is aware of the loss of the cellular phone.

Also, even if the user is aware of the loss of the cellular phone after a while, when the cellular phone is originally set in a state where a remote lock operation cannot be executed, for example, when the cellular phone 1 is present in its contact prohibited area, or when the radio communication of the cellular phone 1 is off, or when the power of the cellular phone 1 is off, a remote lock operation cannot be carried out on the cellular phone 1. Hereinafter, "remote lock" may include a state where a mobile communication device, such as cellular phone, is locked not to be operated when a message including a predetermined key-word is received from a predetermined sender, or when a communication is received from a predetermined telephone in a predetermined times in a specified time-period. Therefore, suppose the cellular phone 1 is set in a state where a remote lock operation cannot be carried out, when the lost cellular phone 1 is found by a third party, before the state of the cellular phone 1 is switched over to a remote lock operation allowable state after the cellular phone 1 is found (for example, before it is switched from the contact prohibited state over to the contact allowable state), the cellular phone 1 can be used illegally by the third party.

Thus, according to the above-mentioned related-art, when a cellular phone with a built-in contactless IC chip is lost while the user thereof is unaware of the loss of the cellular phone, it is difficult to properly prevent a third party (for example, the finder of the cellular phone) from using the cellular phone illegally.

According to an aspect of the invention, there is provide an information processing apparatus, comprising: a first control unit configured to judge whether or not the information processing apparatus is in a state where a remote lock operation is impossible; an input unit configured to accept input of authentication information in case that the first control unit judges that the information processing apparatus is in a state where the remote lock operation is impossible; an authenticate unit configured to authenticate whether or not the input-accepted authentication information is coincident with previously stored authentication information; and a second control unit configured to prohibit a transmission/reception of data between the information processing apparatus and an information read device disposed adjacent to the information processing apparatus.

According to another aspect of the invention, there is provided an information processing apparatus, comprising: a judge unit configured to judge whether or not an input accept cycle for a previously determined authentication information is passed after data is transmitted/received between the information processing apparatus and an information read device disposed adjacent to the information processing apparatus; an input unit configured to accept an input of authentication information when the judge unit judges that the input accept cycle for previously determined authentication information is passed after data is transmitted/received between the information processing apparatus and the information read device; an authenticate unit configured to authenticate whether or not the input-accepted authentication information is coincident with previously stored authentication information; and a second control unit configured to prohibit a transmission/reception of data between the information processing apparatus and an information read device disposed adjacent to the information processing apparatus.

According to another aspect of the invention, there is provide an information processing apparatus, comprising: a judge unit configured to judge whether or not the information processing apparatus is unused for a predetermined period after data is transmitted/received between the information processing apparatus and an information read device disposed adjacent to the information processing apparatus; an input unit configured to accept input of authentication information when the judge unit judges that the information processing apparatus is unused for a predetermined period after data is transmitted/received between the information processing apparatus and the information read device; an authenticate unit configured to authenticate whether or not the input-accepted authentication information is coincident with previously stored authentication information; and a second control unit configured to prohibit transmission/reception of data between the information processing apparatus and the information read device.

BRIEF DESCRIPTION OF THE DRAWINGS

FIGS. 1A and 1B are exemplary external views of the structure of the appearance of a cellular phone according to an embodiment.

FIG. 4 is an exemplary flow chart of a password input accept processing in the cellular phone shown in FIG. 3.

DESCRIPTION OF THE EMBODIMENTS

Figure 2A:
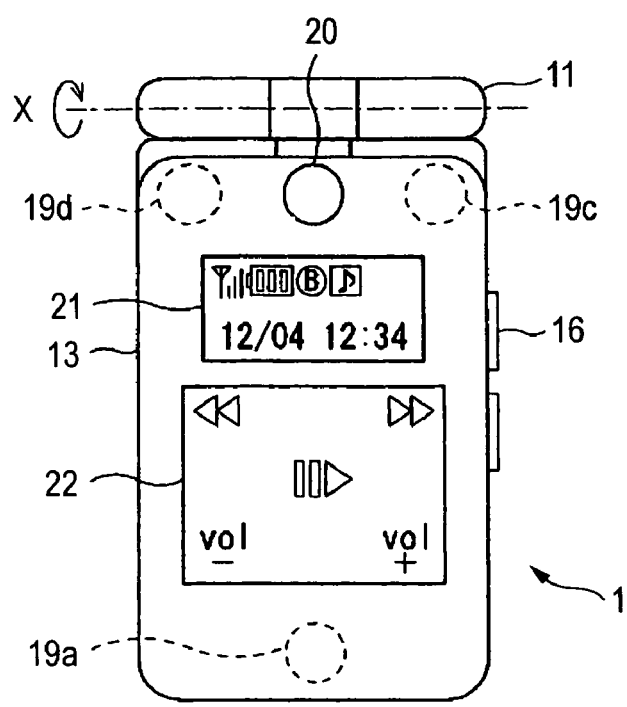
FIGS. 2A and 2B are exemplary another external views of the structure of the appearance of a cellular phone according to the embodiment.

Now, description will be given below of a preferred embodiment of an information processing apparatus with reference to the accompanying drawings.

FIGS. 1A and 1B are external views of the structure of an appearance of a cellular phone 1. FIG. 1A is a front view of the appearance of the cellular phone 1 when it is opened about 180°, and FIG. 1B is a side view of the appearance of the cellular phone 1 when it is opened about 180°.

As shown in FIGS. 1A and 1B, in the cellular phone 1, a first box body 12 and a second box body 13 are hinge connected to each other through a hinge part 11 provided in the central portion of the cellular phone 1; and thus, the cellular phone 1 is formed such that it can be folded in the arrow mark X direction. At a given position in the inside of the cellular phone 1, there is disposed a transmit-receive antenna (an antenna 44 shown in FIG. 3 which will be discussed later), whereby the cellular phone 1 transmits and receives radio waves to and from a base station (not shown) through the built-in antenna.

On the surface of the first box body 12, there are provided operation keys 14 such as numeral keys ranging from [0] to [9], a call key, a redial key, a call-end/power key, a clear key, and an electronic mail key; and, various instructions can be input using the operation keys 14.

On the first box body 12, specifically, on the upper portion of the first box body 12, as the operation keys 14, there are provided a cross key and a determination key; and, when a user operates the cross key in the vertical and horizontal directions, a cursor displayed can be moved in the vertical and horizontal directions. In particular, there can be carried out various operations such as an operation to scroll through a telephone book list and an electronic mail displayed on a liquid crystal display 17 provided on the second box body 13, an operation to turn over the pages of a simple home page, and an image feed operation.

Also, by pressing down the determination key, various functions can be determined. For example, when a desired phone number is selected from two or more phone numbers contained in the phone book list displayed on the liquid crystal display 17 in response to the operation of the cross key by the user and the determination key is pressed down in the internal direction of the first box body 12, the first box body 12 determines the selected phone number and carries out a calling processing on the phone number.

Further, on the first box body 12, in the left neighborhood of the cross key and determination key, there is provided an electronic mail key and, when the electronic key is depressed in the internal direction of the first box body 12, a mail transmit-receive function can be called. And, in the right neighborhood of the cross key and determination key, there is provided a browser key and, when the browser key is pressed down in the internal direction of the first box body 12, the data of the Web page can be read. By the way, the electronic mail key and browser key, which are respectively provided in the left and right neighborhood of the cross key and determination key, are capable of having various functions such as [Yes] or [No] according to a screen to be displayed on the liquid crystal display 17 and, therefore, they are referred to as a soft 1 key and a soft 2 key respectively.

Also, on the first box body 12, in the lower portion of the operation keys 14, there is provided a microphone 15 and the voices of the user during a phone call can be collected by the microphone 15. Further, on the first box body 12, there is provided a side key 16 which is used to operate the cellular phone 1.

By the way, in the back side of the first box body 12, there is inserted a battery pack (not shown) and, when the call end/power key is turned on, power is supplied from the battery pack to the respective circuit portions of the cellular phone 1, thereby driving the cellular phone 1 into an actuatable state.

Figure 2B:
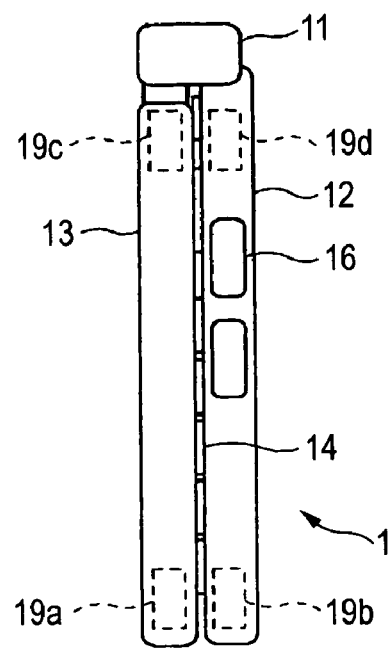

On the other hand, on the front surface of the second box body 13, there is provided the liquid crystal display 17 (main display) and, on the liquid crystal display 17, there can be displayed not only the receiving state of radio waves, the residual amount of the battery, names and phone numbers registered as a phone book and transmission history, but also the contents of electronic mails, a simple home page, images picked up by a CCD (Charge Coupled Device) camera (a CCD camera 20 shown in FIGS. 2A, 2B which will be discussed later), contents received from an external contents server (not shown), and contents stored in a memory card (a memory card 46 shown in FIGS. 2A, 2B which will be discussed later). Also, at a given position in the upper portion of the liquid crystal display 17, there is provided a speaker 18 which allows the user to make a voice call.

Also, at given positions in the internal portions of the first and second box bodies 12 and 13, there are provided magnetic sensors 19a, 19b, 19c and 19d which are respectively used to detect the state of the cellular phone 1.

Now, FIGS. 2A, 2B are external views of the structure of another appearance of the cellular phone 1. The state of the cellular phone 1 shown in FIGS. 2A, 2B are states which are obtained by rotating the cellular phone 1 in the arrow mark X direction from the state shown in FIGS. 1A, 1B. By the way, FIG. 2A is an exemplary front view of the structure of the appearance of the cellular phone 1 when the cellular phone 1 is closed, and FIG. 2B is an exemplary side view of the structure of the appearance of the cellular phone 1 when it is closed.

On the upper portion of the second box body 13, there is provided a CCD camera 20, whereby the images of a desired object to be photographed can be picked up. Below the CCD camera 20, there is provided a sub display 21 on which there can be displayed an antenna pictograph for showing the level of the sensitivity of a current antenna, a battery pictograph for showing the current residual energy of the battery of the cellular phone 1, the current time and the like.

Below the sub display 21, there is further provided an electrostatic touch pad 22. Although the electrostatic touch pad 22 is composed of a single touch pad in appearance, actually, there are provided sensors (not shown) at two or more portions in the touch pad 22; and thus, when a user touches the neighborhood of the sensors, the sensors detect the touch of the user, whereby there can be carried out a rewind function, a fast feed function, a volume down operation, a volume up operation, a reproduction operation, a temporary stop operation and other similar operations.

Figure 3:
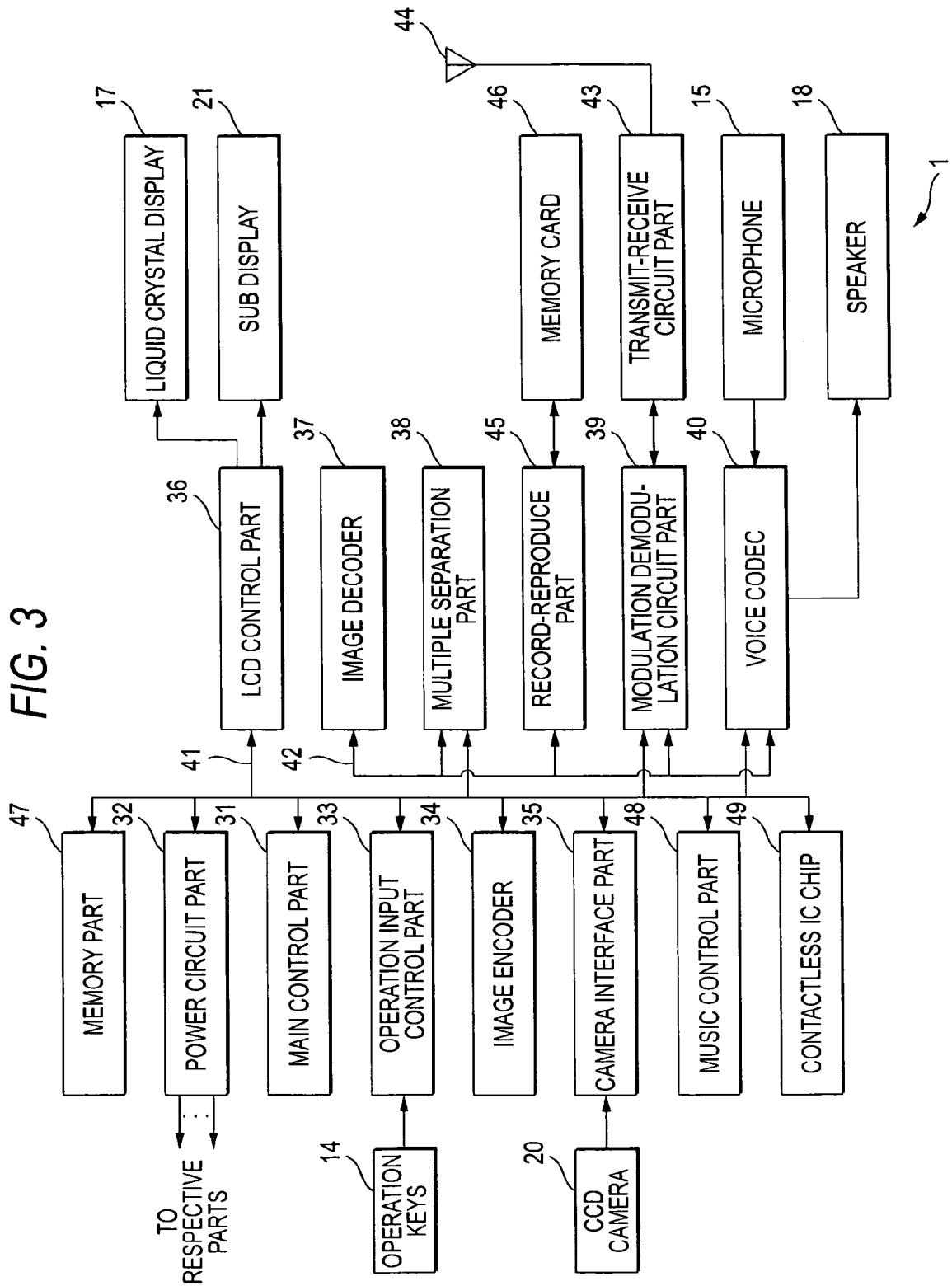
FIG. 3 is an exemplary block diagram of the internal structure of a cellular phone according to the embodiment.

Now, FIG. 3 is a block diagram of the internal structure of the cellular phone 1.

As shown in FIG. 3, the cellular phone 1 is structured such that, to a main control part 31 which generally controls the respective parts of the first and second box bodies 12 and 13, through a main bus 41, there are connected a power circuit part 32, an operation input control part 33, an image encoder 34, a camera interface part 35, an LCD (Liquid Crystal Display) control part 36, a multiple separation part 38, a modulation demodulation circuit part 39, a voice codec 40, a memory part 47, a music control part 48, and a contactless IC chip 49, while these parts are also connected to each other through the main bus 41; and also, to the main control part 31, through a synchronous bus 42, there are connected the image encoder 34, an image decoder 37, the multiple separation part 38, the modulation demodulation circuit part 39, the voice codec 40 and a record reproduce part 45 are connected to each other through a synchronous bus 42, while these parts are connected to each other through the synchronous bus 42.

When the call-end/power key is turned on through the operation of a user, the power circuit part 32 supplies power to the respective parts from a battery pack to thereby put the cellular phone 1 into its actuatable state.

The main control part 31 is composed of a CPU (Central Processing Unit), a ROM (Read Only Memory), a RAM (Random Access Memory) and the like. The CPU, according to a program stored in the ROM or various application programs loaded from the memory part 47 to the RAM, not only executes various processings but also generates various control signals and supplies them to the respective parts to thereby control the cellular phone 1 generally. The RAM stores properly data which are necessary when the CPU executes various processing.

By the way, in the main control part 31, there is built a timer (for example, an RTC (Real Time Clock)) which is used to measure the current date and time accurately.

The cellular phone 1, based on the control of the main control part 31, converts voice signals collected by the microphone 15 in the voice call mode into digital voice signals and compresses them using the voice codec 40, spectrum expansion processes the compressed digital voice signals using the modulation demodulation circuit part 39, enforces a digital analog conversion processing and a frequency conversion processing on the thus spectrum expansion processed signals using the transmit-receive circuit part 43, and, after then, transmits the resulting signals through an antenna 44.

Also, the cellular phone 1 amplifies signals received by the antenna 44 in the voice call mode, executes a frequency conversion processing and an analog digital conversion processing on the thus amplified signals, executes a spectrum inversed expansion processing on the thus processed signals using the modulation demodulation circuit part 39, expands the thus processed signals using the voice codec 40 to convert the signals to analog voice signals, and, after then, outputs the thus converted analog voice signals through the speaker 18.

Further, the cellular phone 1, when transmitting an electronic mail in a data communication mode, outputs the text data of an electronic mail input by the operation of the operation keys 14 to the main control part 31 through the operation input control circuit 33. The main control part 31 controls the modulation demodulation circuit part 39 to carry out a spectrum expansion processing on the text data and next controls the send receive circuit part 43 to execute a digital analog conversion processing and a frequency conversion processing on the thus processed text data, and, after then, transmits the thus processed text data to a base station (not shown) through the antenna 44.

On the other hand, when receiving an electronic mail in the data communication mode, the cellular phone 1 drives the modulation demodulation circuit part 39 to enforce a spectrum inversed expansion processing on signals received from the base station (not shown) through the antenna 44 to thereby reconstitute the original text data and, after then, displays the reconstituted text data on the liquid crystal display 17 as an electronic mail through the LCD control part 36.

After then, the cellular phone 1 is also able to record the electronic mail, which has been received in response to the user operation, into a memory card 46 through the record reproduce part 45.

The cellular phone 1, when it does not transmit an image signal, displays an image signal picked up by the CCD camera 20 directly on the liquid crystal display 17 through the camera interface part 35 and LCD control part 36.

The cellular phone 1, when it transmits an image signal in the data communication mode, supplies an image signal picked up by the CCD camera 20 to the image encoder 34 through the camera interface part 35.

The image encoder 34 compresses and encodes an image signal supplied from the CCD camera 20 according to a given encoding method such as MPEG (Moving Picture Experts Group) 4 to thereby convert it to an encoded image signal, and feeds the thus converted encoded image signal to the multiple separation part 38. Simultaneously with this operation, the cellular phone 1 feeds a voice, which has been collected by the microphone 15 during the image pickup operation by the CCD camera, to the multiple separation part 38 through the voice codec 40 as a digital voice signal.

The multiple separation part 38 multiplexes the encoded image signal supplied from the image encoder 34 and the voice signal supplied from the voice codec 40 according to a given method. The resultant multiplexed signal is spectrum expansion processed by the modulation demodulation circuit part 39, and the transmit-receive circuit part 43 executes a digital analog conversion processing and a frequency conversion processing on the thus processed signal; and, after then, the resultant signal is transmitted through the antenna 44.

On the other hand, the cellular phone 1, in the data communication mode, is able to receive the data of the Web page.

That is, when the cellular phone 1, in the data communication mode, transmits data requiring the Web page, in response to this request, the data of the Web page is transmitted through the base station (not shown). The data of the Web page is received through the antenna 44 by the transmit-receive circuit part 43 and modulation demodulation circuit part 39. The transmit-receive circuit part 43 and modulation demodulation circuit part 39 transmit the received data of the Web page to the main control part 31.

The main control part 31 interprets the data of the Web page and creates a screen (an image) based on its interpretation. The created screen is supplied from the main control part 31 to the liquid crystal display 17 through the LCD control part 36 and is displayed on the liquid crystal display 17. That is, in the ROM or memory part 47 of the main control part 31, there is installed at least the application program of the Web browser; and thus, since the CPU of the main control part 31 executes the application program of the Web browser on the RAM, the CPU functions as the Web browser and interprets the data of the Web page.

Also, when the cellular phone 1 receives the data of a time-varying image file linked with the Web page or the like in the data communication mode, the cellular phone 1 executes a spectrum inversed expansion processing on a signal received from the base station (not shown) through the antenna 44 using the modulation demodulation circuit part 39, and transmits the resultant multiplex signal to the multiple separation part 38.

The multiple separation part 38 separates the multiplex signal into an encoded image signal and a voice signal. Then, the multiple separation part 38 supplies the encoded image signal to the image decoder 37 and the voice signal to the voice codec 40 respectively through the synchronous bus 42. The image decoder 37 decodes the encoded image signal according to a decoding method corresponding to a given encoding method such as MPEG 4 to thereby generate a reproduction time-varying image signal, and then it supplies the thus generated reproduction time-varying image signal to the liquid crystal display 17 through the LCD control part 36. As a result of this, on the liquid crystal display 17, there are displayed time-varying image data contained in the time-varying image file linked with, for example, the Web page.

Simultaneously with this operation, the voice codec 40 converts the voice signal to an analog voice signal and then supplies the thus converted analog voice signal to the speaker 18, with the result that there is reproduced a voice signal contained in the time-varying image file linked with, for example, the Web page. In this case as well, similarly to the case of the electronic mail, the cellular phone 1 is able to record the received data linked with the Web page or the like in the memory card 46 through the record reproduce part 45 by means of the operation of the user.

Now, the memory part 47 is composed of, for example, a flash memory element such as a nonvolatile memory which can be rewritten or erased electrically, and stores therein various application programs to be executed by the CPU of the main control part 31 and various data groups. Also, as the need arises, the memory part 47 stores therein an electronic mail received according to the operation of the user, time-varying image data contained in a time-varying image file linked with the received Web page or the like, and other similar information.

The music control part 48 controls the execution of various operations on audio data stored in the memory part 47, such as the reproduction operation and temporary stop operation thereof, the rewind operation thereof, the fast feed operation thereof, the volume down operation thereof, the volume up operation thereof and the like.

The contactless IC chip 49 is structured such that, when the cellular phone 1 is disposed adjacent to an IC reader/writer (not shown) applicable as an information read device and receives electromagnetic waves radiated from the IC reader/writer, in response to such electromagnetic wave reception, the contactless IC chip 49 supplies various information (such as electronic money information) to the IC reader/writer. Thanks to this, between the cellular phone 1 and a host computer connected to the IC reader/writer (not shown), there can be executed, for example, a settlement processing and an authentication processing.

By the way, suppose the cellular phone 1 with the contactless IC chip 49 built therein is lost while the user is unaware of the loss, even if the user is aware of the loss of the cellular phone 1 after a while, the cellular phone 1 can be used by a third party (for example, the finder of the cellular phone 1) during the time before the user is aware of the loss of the cellular phone 1.

Also, even if the user is aware of the loss of the cellular phone 1 after a while, when the cellular phone 1, at the then time, is held in a state where it cannot be remotely locked, for example, in a state where it exists outside the contactable area or in a power off state, it is impossible for the user to execute a remote lock operation on the cellular phone 1. Therefore, when the cellular phone 1 is held in a state where a remote lock operation cannot be executed, if the lost cellular phone 1 is found and picked up by a third party, the cellular phone 1 can be used by the third party during the time before the cellular phone 1 turns from the remote lock operation non-executable state into the remote lock operation executable state (for example, the cellular phone 1 is moved from outside the contactable area to inside the contactable area).

In other words, even when the cellular phone 1 is lost and is then found and picked up by a third party while the cellular phone 1 is in the remote lock operation executable state, if the third party turns off the power of the cellular phone 1 for the purpose of using it illegally after finding of the cellular phone 1, because of the intentional action of the third party after finding of the cellular phone 1, the user is unable to execute the remote lock operation on the cellular phone 1, with the result that the cellular phone 1 can be used illegally by the third party.

As described above, according to the prior art technology, when the cellular phone 1 with the contactless IC chip 49 built therein is lost while the user is unaware of the loss, it is difficult to properly prevent the illegal use of the cellular phone 1 by the third party (for example, the finder of the cellular phone 1).

In view of the above, according to the embodiment, there is employed the following method in the cellular phone 1. That is, when the cellular phone 1 is held in a remote lock operation non-executable state, for example, when the cellular phone 1 is present outside the contactable area, when the radio communication thereof is off, or when the power thereof is off, unless a password is input or bio-authentication is executed to thereby authenticate that the current user is a legal user before data are given and received by and between the cellular phone 1 and IC reader/writer (not shown) using the contactless IC chip 49, the delivery of the data cannot be started. Thanks to this method, when the cellular phone 1 with the contactless IC chip 49 built therein is lost while the user is unaware of the loss, it is possible to properly prevent the illegal use of the cellular phone 1 by the third party (for example, the finder of the cellular phone 1). Now, description will be given below of a password input accept processing in the cellular phone 1 using the above method.

Description will be given below of the password input accept processing in the cellular phone 1 shown in FIG. 3 with reference to a flow chart shown in FIG. 4. This password input accept processing is started when, after the cellular phone 1 with the contactless IC chip 49 built therein is lost while the user is unaware of the loss and then the cellular phone 1 is found and picked up by a third party (for example, the finder of the cellular phone 1), the third party is going to start the delivery of data between the cellular phone 1 and IC reader/writer (not shown) using the contactless IC chip 49 built in the cellular phone 1. By the way, in the password input accept processing to be described with reference to the flow chart shown in FIG. 4, as authentication information, for example, there is used a password.

In Step S1, when starting the delivery of data between the cellular phone 1 and IC reader/writer (not shown) using the contactless IC chip 49 built in the cellular phone 1, the main control part 31 checks whether the cellular phone 1 is held in a state where a remote lock operation cannot be executed (for example, a state where the cellular phone 1 exists outside the contactable area, a radio communication off state where communication using radio waves between the cellular phone 1 and a base station (not shown) is not executed, and a power off state) or not.

When, in Step S1, it is judged that the state of the cellular phone 1 is in a state where a remote lock operation cannot be executed (for example, a state where the cellular phone 1 exists outside the contactable area, a radio communication off state where communication using radio waves between the cellular phone 1 and a base station (not shown) is not executed, and a power off state), the main control part 31 controls the LCD control part 36 to display on the liquid crystal display 17 a password input accept screen for accepting the input of a password.

Figure 5A:
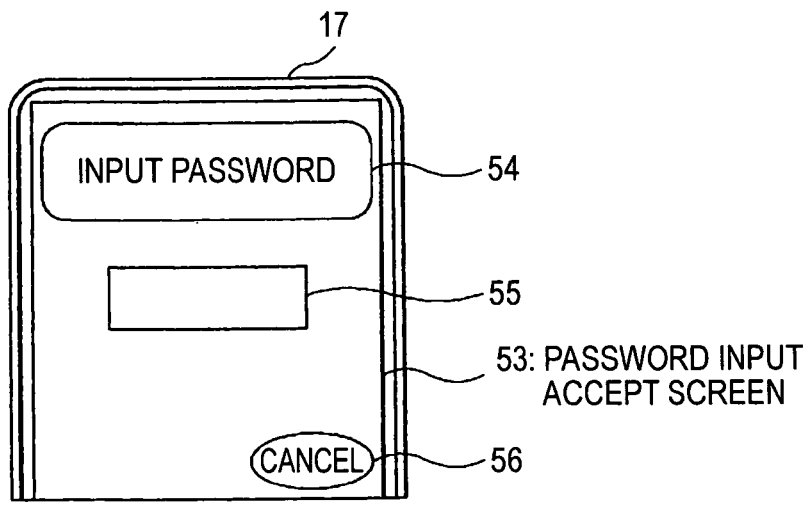
FIGS. 5A, 5B, and 5C are exemplary views of a display example to be displayed on a liquid crystal display shown in FIG. 3.

For example, a password input accept screen 53 shown in FIG. 5A includes a message display column 54, a password input accept column 55 and a command display column 56.

In the case of the example shown in FIG. 5A, on the message display column 54, as a message, there is displayed a sentence telling "Input the password." This tells the third party (for example, the finder of the cellular phone 1) that the password must be input according to the following processings.

The password input accept column 55 is a column for accepting the input of the password. The command display column 56 includes the icon of a command telling "cancel". The third party (for example, the finder of the cellular phone 1), by operating the operation keys 14, is able to select the command icon "cancel" and thereby cancel the password input processing.

After then, the third party (for example, the finder of the cellular phone 1) inputs the password or cancels the password input processing to thereby stop the delivery of data between the cellular phone 1 and IC reader/writer (not shown) using the contactless IC chip 49. This makes it possible to prohibit the third party (for example, the finder of the cellular phone 1) from executing the data delivery between the cellular phone 1 and IC reader/writer (not shown) using the contactless IC chip 49.

In step S3, the main control part 31 checks whether "cancel" is instructed on the password input accept screen by the third party (for example, the finder of the cellular phone 1) operating the operation keys 14 or not.

When, in step S3, it is judged that "cancel" is instructed on the password input accept screen by the third party (for example, the finder of the cellular phone 1) operating the operation keys 14, the main control part 31, in step S4, prohibits the execution of the data delivery between the cellular phone 1 and IC reader/writer (not shown) using the contactless IC chip 49. After then, the password input accept processing is ended.

Therefore, suppose the cellular phone 1 with the contactless IC chip 49 built therein is lost while the user is unaware of the loss, even when, after a third party (for example, the finder of the cellular phone 1) finds and picks up the cellular phone 1, the third party is going to start the execution of the data delivery between the cellular phone 1 and IC reader/writer (not shown) using the contactless IC chip 49, unless the correct password is input onto the password input accept screen, the data delivery between the cellular phone 1 and IC reader/writer (not shown) cannot be executed.

When, in step S3, it is judged that "cancel" is not instructed on the password input accept screen by the third party (for example, the finder of the cellular phone 1) operating the operation keys 14, the main control part 31, in step S5, accepts the input of the password by the third party (for example, the finder of the cellular phone 1) operating the operation keys 14.

Figure 5B:
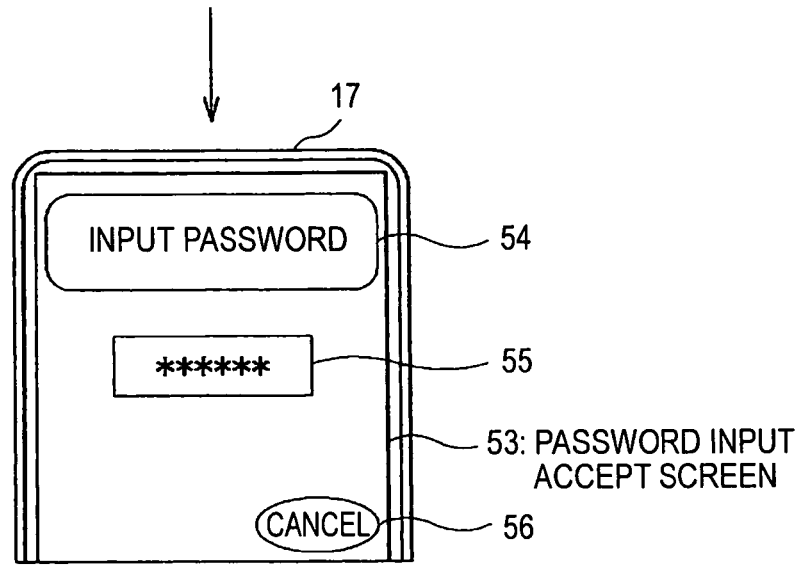

For example, as shown in FIG. 5B, there is accepted the input of six-figure numbers (such as 562189) as a password. Of course, the number of figures as a password may also be other than the six-figure numbers. By the way, in the case of the example shown in FIG. 5B, on the password input accept screen, there is displayed "******".

In step S6, the main control part 31 reads the password that is previously stored in the memory part 47 and also authenticates whether the thus read password coincides with the password input-accepted on the password input accept screen or not.

When it is authenticated that the password read in step S6 coincides with the password input-accepted on the password input accept screen, the main control part 31, in step S7, controls the contactless IC chip 49 to start the delivery of data between the cellular phone 1 and IC reader/writer. For example, there is executed a settlement processing using electronic money information between the contactless IC chip 49 and IC reader/writer (not shown).

Figure 5C:
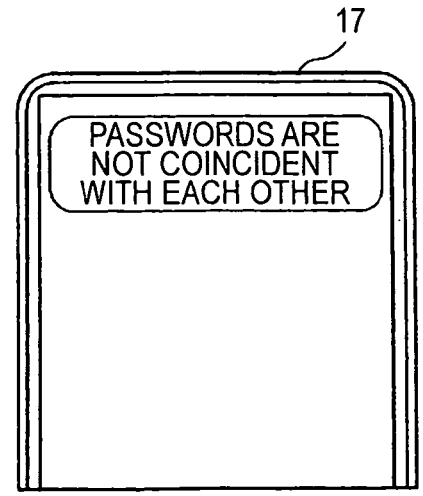

On the other hand, when it is authenticated that the password read in the step S6 does not coincide with the password input-accepted on the password input accept screen, the main control part 31, in the step S8, executes an error processing. That is, for example, as shown in FIG. 5C, there is displayed a message to the effect that the input-accepted password does not coincide with the correct password. After then, the processing goes to the step S4, the execution of the data delivery between the cellular phone 1 and IC reader/writer (not shown) using the contactless IC chip 49 is prohibited, and the password input accept processing is ended.

Thanks to this, suppose the cellular phone 1 with the contactless IC chip 49 built therein is lost while the user is unaware of the loss, when, after a third party (for example, the finder of the cellular phone 1) finds and picks up the cellular phone 1, in order to start the execution of the data delivery between the cellular phone 1 and IC reader/writer (not shown) using the contactless IC chip 49, the third party (for example, the finder of the cellular phone 1) is going to input a password onto the password input accept screen, unless the correct password is input onto the password input accept screen, the start of the data delivery between the cellular phone 1 and IC reader/writer (not shown) can be prevented and thus the execution of the data delivery between the cellular phone 1 and IC reader/writer can be prohibited.

In the step S1, when it is judged that the cellular phone 1 is not in a state where a remote lock operation cannot be executed (for example, a state where the cellular phone 1 exists outside the contactable area, a radio communication off state where communication using radio waves between the cellular phone 1 and a base station (not shown) is not executed, and a power off state) (that is, when it is judged that the cellular phone 1 is held in a state where a remote lock operation can be executed), the processing goes to the step S7 and, in the processing of the step S7, the execution of the data delivery between the cellular phone 1 and IC reader/writer can be started. By the way, suppose the cellular phone 1 with the contactless IC chip 49 built therein is lost while the user is unaware of the loss, even when a third party (for example, the finder of the cellular phone 1) finds and picks up the cellular phone 1, in this case, because the cellular phone 1 is held in a state where a remote lock operation can be executed, the user is able to execute the remote lock operation on the cellular phone 1, thereby being able to prevent the third party from using the cellular phone 1 illegally. Of course, even when the cellular phone 1 is held in a state where a remote lock operation can be executed, similarly to the case where the cellular phone 1 is held in a state in which the remote lock operation cannot be executed, it may also be required to carry out the operation for accepting the input of a password.

In the embodiment, suppose a user loses a cellular phone 1 with a built-in contactless IC chip 49 while the user is unaware of the loss, when, after a third party (for example, the finder of the cellular phone 1) finds and picks up the cellular phone 1, the third party is going to start the data delivery between the cellular phone 1 and IC reader/writer (not shown) using the contactless IC chip 49, it is checked whether the cellular phone 1 is held in a state in which a remote lock operation can be executed or not. When it is judged that the cellular phone 1 is held in a state in which the remote lock operation cannot be executed, there is displayed the password input accept screen for accepting the input of the password as authentication information and, at the same time, it is authenticated whether the password the input of which is accepted is coincident with the previously stored password or not. When it is authenticated that the input-accepted password is not coincident with the previously stored password, the execution of the data delivery between the cellular phone 1 and IC reader/writer (not shown) using the contactless IC chip 49 is prohibited. Therefore, even when the cellular phone 1 is held in a state where the remote lock operation cannot be executed, it is possible to prevent the third party (for example, the finder of the cellular phone 1) from using the cellular phone 1 illegally.

Accordingly, when the user loses the cellular phone 1 with the built-in contactless IC chip 49, it is possible to properly prevent the third party (for example, the finder of the cellular phone 1) from using the cellular phone 1 illegally. This makes it possible to enhance the safety of the cellular phone 1 when the contactless IC chip 49 incorporated in the cellular phone 1 is used.

By the way, in the password input accept processing described with reference the flow chart shown in FIG. 4, as the authentication information, for example, there is used the password. However, the authentication may also be made by other means than the password, for example, bio-authentication (such as fingerprint authentication or voice print authentication, image authentication and venous authentication); or, there may be used other authentication methods. Here, the information such as the password and bio-authentication information is defined as authentication information.

By the way, in the password input accept processing described with reference the flow chart shown in FIG. 4, when it is judged that the cellular phone 1 is held in a state where a remote lock operation cannot be executed (for example, a state where the cellular phone 1 exists outside the contactable area, a radio communication off state where communication using radio waves between the cellular phone 1 and a base station (not shown) is not executed, and a power off state where the power of the cellular phone 1 is off), there is displayed the password input accept screen and the input of the password is accepted. However, for example, even if the cellular phone 1 is held in the remote lock operation executable state, the user is not always able to execute the remote lock operation on the cellular phone 1 before the third party (such as the finder of the cellular phone 1) uses the contactless IC chip 49 illegally. In other words, there is a danger that, before execution of the remote lock operation by the user, the third party (such as the finder of the cellular phone 1) can use the contactless IC chip 49 illegally.

Also, when the user drops and loses the cellular phone 1 just after the user delivers the data between the cellular phone 1 and IC reader/writer (not shown) using the contactless IC chip 49 incorporated in the cellular phone 1 (for example just after the user executes a settlement processing), there is a danger that the third party (such as the finder of the cellular phone 1) can use the cellular phone 1 illegally before the user is aware of the loss of the cellular phone 1.

To avoid such danger, in the cellular phone 1, there may also be employed a below-mentioned method: that is, after the user delivers the data between the cellular phone 1 and IC reader/writer (not shown) using the contactless IC chip 49 incorporated in the cellular phone 1 (for example just after the user executes a settlement processing), unless the user is authenticated to be the legal user by inputting the password at a previously set given password input accept cycle or by executing bio-authentication, the execution of the data delivery cannot be started. Thanks to the employment of this method, when the user loses a cellular phone 1 with a built-in contactless IC chip 49 while the user is unaware of the loss, whether the user is aware of the loss of the cellular phone 1 or not, it is possible to properly prevent the third party (such as the finder of the cellular phone 1) from using the cellular phone 1. Next, description will be given below of another password input accept processing in the cellular phone 1 using the above method.

That is, description will be given below of another password input accept processing in the cellular phone 1 using the above method with reference to a flow chart shown in FIG. 6. This password input accept processing can be started when the user loses a cellular phone 1 with a built-in contactless IC chip 49 while the user is unaware of the loss of the cellular phone 1, a third party (such as the finder of the cellular phone 1) finds and picks up the cellular phone 1, and then the third party is going to start delivery of data between the cellular phone 1 and IC reader/writer (not shown) using the contactless IC chip 49 built in the cellular phone 1.

Figure 6:
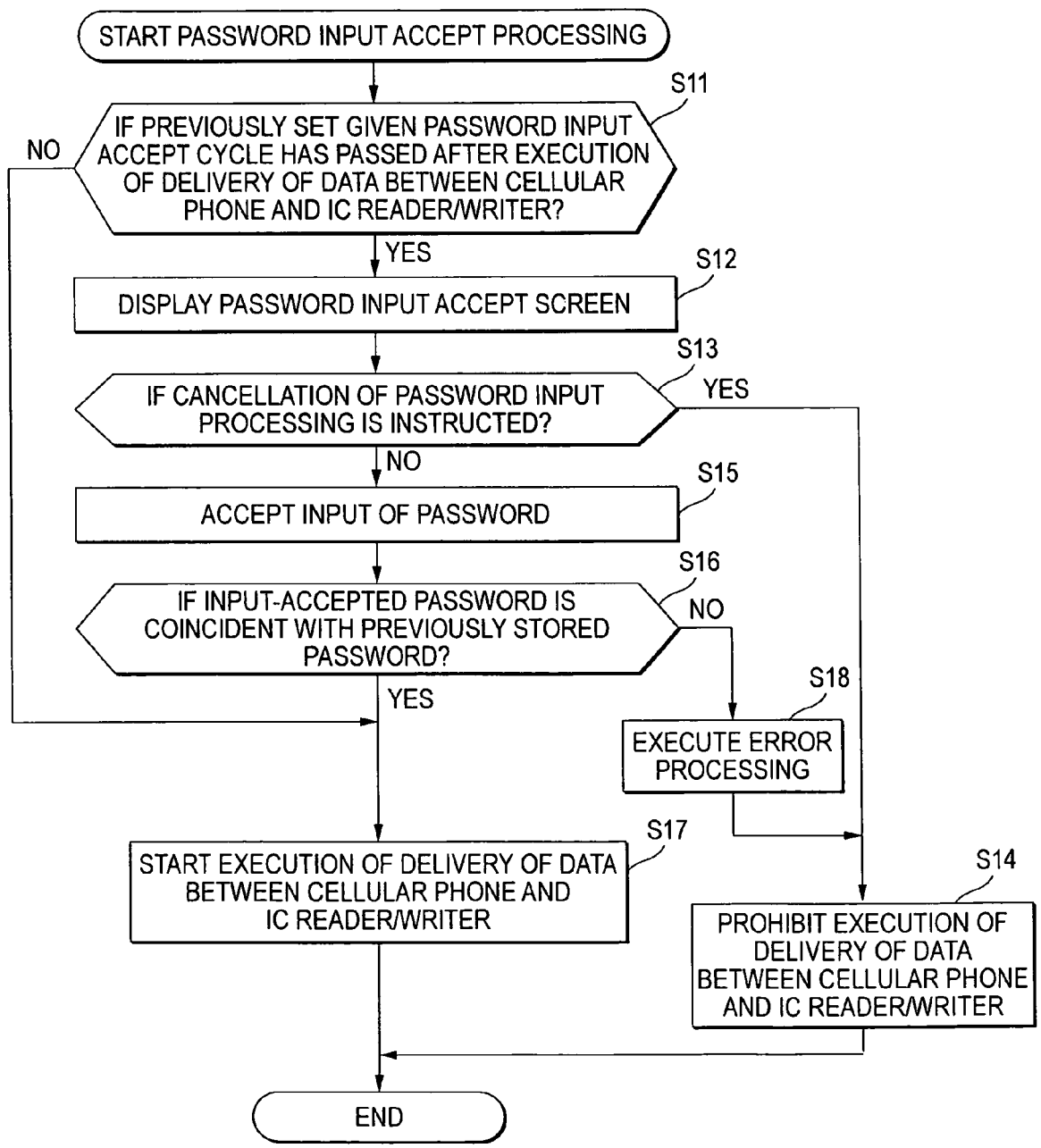
FIG. 6 is an exemplary flow chart of another password input accept processing in the cellular phone shown in FIG. 3.

By the way, processings to be executed in steps S12 to S18 shown in FIG. 6 are basically similar to those of the steps S2 to S8 shown in FIG. 4 and thus, to avoid repetition, the description thereof is omitted here.

In the step S11, the main control part 31 checks whether, after the user executes data delivery between the cellular phone 1 and IC reader/writer (not shown) using the contactless IC chip 49 (for example, after the user executes a settlement processing), a previously set given password input accept cycle (for example, five minutes) has passed or not.

In step S11, when it is judged that, after the user executes data delivery between the cellular phone 1 and IC reader/writer (not shown) using the contactless IC chip 49 (for example, after the user executes a settlement processing), the previously set given password input accept cycle (for example, five minutes) has passed, the processing goes to the step S12 and, in the step 12, there is displayed the password input accept screen and an authentication processing is enforced on the input-accepted password.

Thanks to this, suppose the user loses a cellular phone 1 with a built-in contactless IC chip 49 while the user is unaware of the loss of the cellular phone 1, even when, after the third party (such as the finder of the cellular phone 1) finds and picks up the cellular phone 1, the third party is going to start delivery of data between the cellular phone 1 and IC reader/writer (not shown) using the contactless IC chip 49 built in the cellular phone 1, unless the third party (such as the finder of the cellular phone 1) inputs the correct password onto the password input accept screen at the previously set given password input accept cycle after use of the user, the data delivery cannot be started between the cellular phone 1 and IC reader/writer (not shown).

On the other hand, in step S11, when it is judged that, after the user executes data delivery between the cellular phone 1 and IC reader/writer (not shown) using the contactless IC chip 49 (for example, after the user executes a settlement processing), the previously set given password input accept cycle (for example, five minutes) has not passed, the processing goes to the step S17 and, in the step 17, data delivery between the cellular phone 1 and IC reader/writer (not shown) using the contactless IC chip 49 of the cellular phone 1 is executed.

Thanks to this, suppose the user does not lose the cellular phone 1 with a built-in contactless IC chip 49, after execution of data delivery between the cellular phone 1 and IC reader/writer (not shown) (for example, after execution of a settlement processing) by the user, while the previously set given password input accept cycle (for example, five minutes) has not passed, without executing the password input processing and authentication processing, the execution of data delivery between the cellular phone 1 and IC reader/writer (not shown) can be started. Therefore, the convenience of the cellular phone 1 when the contactless IC chip 49 built in the cellular phone 1 is used can be enhanced.

According to the embodiment, suppose the user loses a cellular phone 1 with a built-in contactless IC chip 49 while the user is unaware of the loss of the cellular phone 1, when, after the third party (such as the finder of the cellular phone 1) finds and picks up the cellular phone 1, the third party is going to start delivery of data between the cellular phone 1 and IC reader/writer (not shown) using the contactless IC chip 49 built in the cellular phone 1, it is checked whether, after the user executes data delivery between the cellular phone 1 and IC reader/writer (not shown) using the contactless IC chip 49 (for example, after the user executes a settlement processing), the previously set given password input accept cycle (for example, five minutes) has passed or not. When it is judged that the previously set given password input accept cycle (for example, five minutes) has passed, there is displayed the password input accept screen for accepting the input of the password as the authentication information and, at the same time, it is authenticated whether the input-accepted password is coincident with the previously stored password or not. When it is authenticated that the input-accepted password is not coincident with the previously stored password, the execution of data delivery between the cellular phone 1 and IC reader/writer (not shown) using the contactless IC chip 49 of the cellular phone 1 is prohibited. Therefore, whether the user is aware of the loss of the cellular phone 1 or not, it is possible to prevent the third party (such as the finder of the cellular phone 1 from using the cellular phone 1 illegally.

Thus, according to the embodiment, when a user loses the cellular phone 1 with a built-in contactless IC chip 49 while the user is unaware of the loss of the cellular phone 1, it is possible to properly prevent a third party (such as the finder of the cellular phone 1) from using the cellular phone 1 illegally. This can enhance the safety of the cellular phone 1 when the contactless IC chip 49 incorporated in the cellular phone 1 is used.

By the way, the password input accept cycle may be set properly according to the taste of a user. Next, description will be given below of a password input accept cycle set processing in the cellular phone 1 using this method.

With reference to a flow chart shown in FIG. 7, description will be given below of the password input accept cycle set processing in the cellular phone 1 shown in FIG. 3. This password input accept cycle set processing can be started when an instruction for the start of the password input accept cycle set processing is given by a user operating the operation keys 14.

In a step S21, the main control part 31 checks whether an instruction for the start of the password input accept cycle set processing is given by a user operating the operation keys 14 or not, and waits until it is judged that the instruction for the start of the password input accept cycle set processing is given by a user operating the operation keys 14.

In the step S21, when it is judged that the instruction for the start of the password input accept cycle set processing is given by a user operating the operation keys 14, the main control part 31, in a step S22, accepts the input of the password input accept cycle by the user operating the operation keys 14. For example, as the password input accept cycle, the input of five minutes can be accepted.

In a step S23, the main control part 31, based on the input-accepted password input accept cycle, sets a password input accept cycle and supplies password input accept cycle set data, which are data on the thus set password input accept cycle, to the memory part 47.

In a step S24, the memory part 47, in accordance with the control of the main control part 31, obtains the password input accept cycle set data supplied from the main control part 31, and stores therein the thus obtained password input accept cycle set data.

Thanks to this method, for example, when the user wants to successively execute delivery of data between the cellular phone 1 and IC reader/writer (not shown) using the contactless IC chip 49, the password input accept cycle can be set longer; and, when the user wants to properly prevent a third party from using the cellular phone 1 illegally, the password input accept cycle can set shorter. Therefore, according to the taste of a user, when using the contactless IC chip 49 incorporated in the cellular phone 1, the safety of the cellular phone 1 can be enhanced or the convenience thereof can be enhanced.

Of course, when the user wants to successively execute the data delivery between the cellular phone 1 and IC reader/writer (not shown) using the contactless IC chip 49, the password input accept cycle may not be set long, but the on/off of the authentication information input accept function may be switched to the off state in order to be able to eliminate the need for execution of the password input accept processing itself. This can enhance further the convenience of the cellular phone 1 when using the contactless IC chip 49 incorporated in the cellular phone 1.

Figure 7:
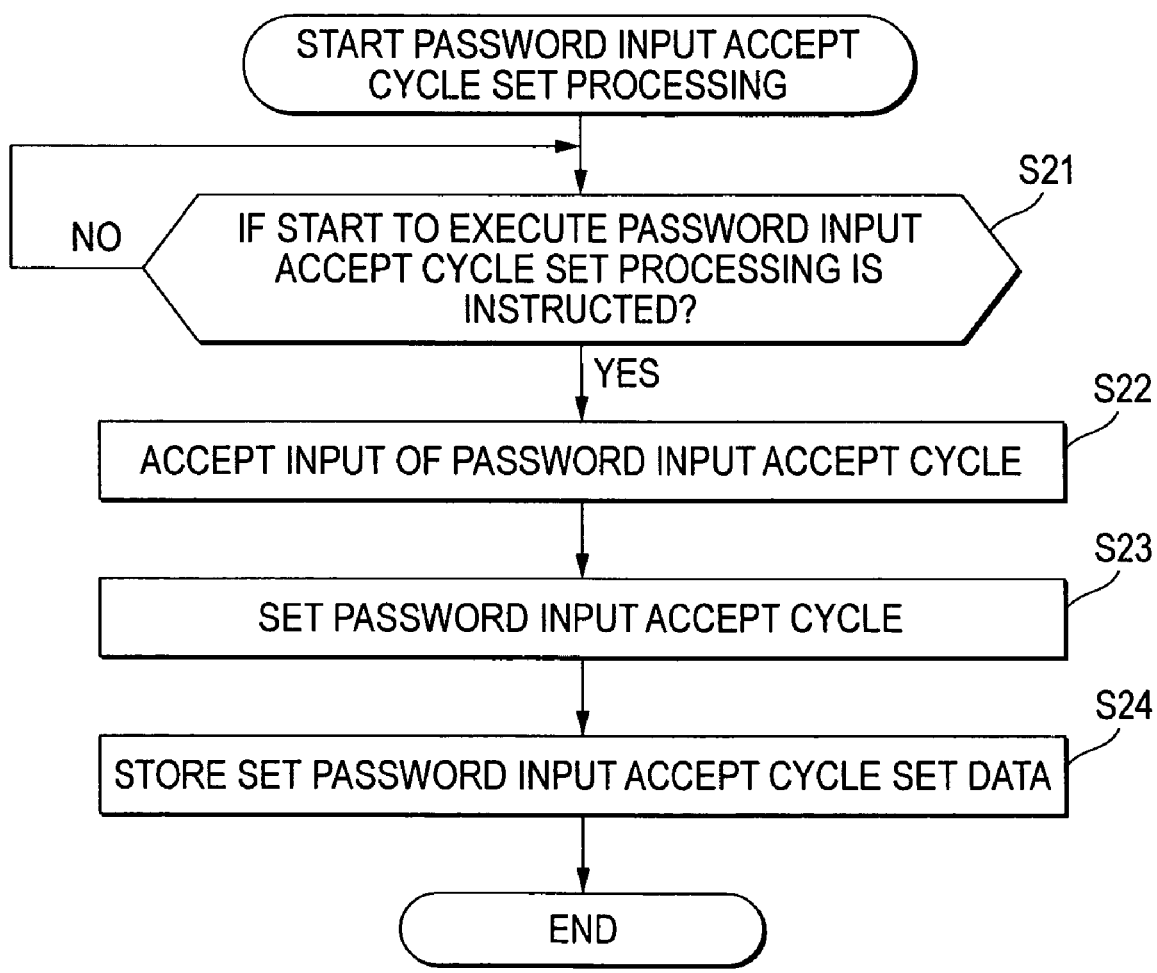
FIG. 7 is an exemplary flow chart of a password input accept cycle set processing in the cellular phone shown in FIG. 3.

By the way, in the password input accept cycle set processing shown in FIG. 7, there is set the password input accept cycle which is the input accept cycle of the password. However, this is not limitative but, for example, there may also be set another input accept cycle such as bio-authentication, or there may also be set various kinds of authentication information which are different in cycles from each other.

Here, the input accept cycle of the password, bio-authentication or the like is defined as "authentication information input accept cycle".

By the way, when a user drops and loses the cellular phone 1, it is expected that the cellular phone 1 is not used for a while. Therefore, when, after the cellular phone 1 has not been used for a previously set given period since the last execution of the data delivery between the cellular phone 1 and IC reader/writer (not shown) using the contactless IC chip 49 built in the cellular phone 1 by the user, the next execution of the data delivery between the cellular phone 1 and IC reader/writer (not shown) using the contactless IC chip 49 built in the cellular phone 1 is to be started, it is considered that a third party (such as the finder of the cellular phone 1) is going to use the cellular phone 1 illegally.

In order to cope with this problem, there may also be employed the below-mentioned method in the cellular phone 1. That is: When, after the cellular phone 1 has not been used for a previously set given period, the next execution of the data delivery between the cellular phone 1 and IC reader/writer (not shown) using the contactless IC chip 49 is to be started, unless the user is authenticated as the correct user by inputting the password or by carrying out a bio-authentication processing, the user is prevented from starting the data delivery between the cellular phone 1 and IC reader/writer (not shown). Next, description will be given below of another password input accept processing in the cellular phone 1 using this method.

Now, with reference to a flow chart shown in FIG. 8, description will be given below of another password input accept processing in the cellular phone 1. This password input accept processing is started when the user loses a cellular phone 1 with a built-in contactless IC chip 49 while the user is unaware of the loss of the cellular phone 1, a third party (such as the finder of the cellular phone 1) finds and picks up the cellular phone 1, and then the third party is going to start delivery of data between the cellular phone 1 and IC reader/writer (not shown) using the contactless IC chip 49 built in the cellular phone 1.

Figure 8:
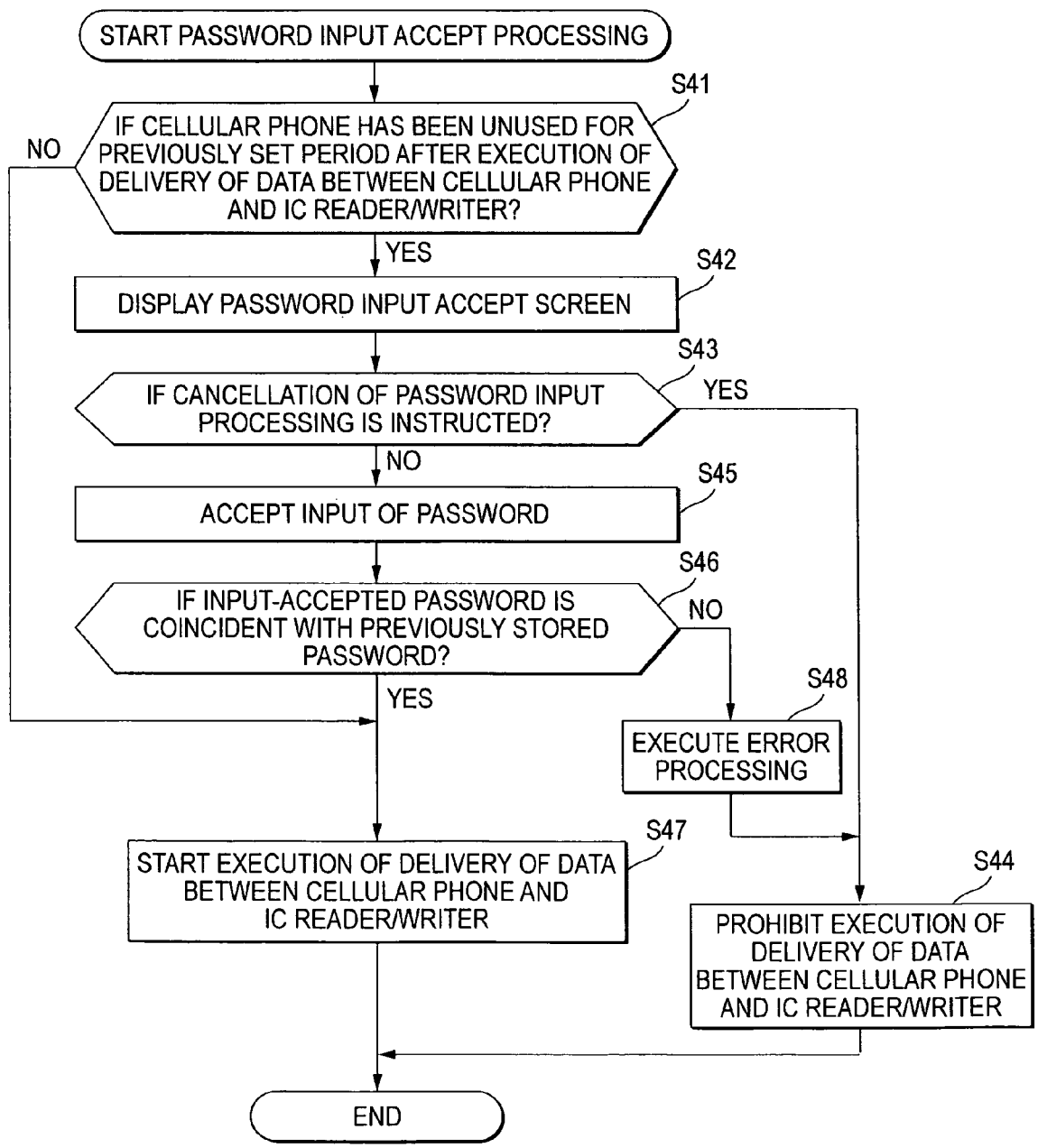
FIG. 8 is an exemplary flow chart of another password input accept cycle set processing in the cellular phone shown in FIG. 3.

By the way, processings to be executed in steps S42 to S48 shown in FIG. 8 are basically similar to those of the steps S2 to S8 shown in FIG. 4 and thus, to avoid duplication, the description thereof is omitted here.

In a step S41, the main control part 31 checks whether, after the user executed data delivery between the cellular phone 1 and IC reader/writer (not shown) using the contactless IC chip 49 (for example, after the user executes a settlement processing), the cellular phone 1 has been unused for a previously set given period (for example, two days) or not. Specifically, by the user operating the operation keys 14 of the cellular phone 1, it is checked whether the cellular phone 1 has been unused for a given period (for example, two days) or not.

Of course, the previously set given period may also be set newly according to the taste of the user.

In the step S41, when it is judged that, after the last execution of the data delivery between the cellular phone 1 and IC reader/writer (not shown) using the contactless IC chip 49 of the cellular phone 1 by the user (for example, after the execution of a settlement processing), the cellular phone 1 has been unused for a previously set given period (for example, two days), the processing goes to a step S42; and, in the step S42, there is displayed the password input accept screen and an authentication processing is enforced on the password the input of which is accepted.

With use of this method, there can be provided the below-mentioned proper effect. That is, suppose the cellular phone 1 with the contactless IC chip 49 built therein is lost while the user is unaware of the loss of the cellular phone 1, a third party (for example, the finder of the cellular phone 1) finds and picks up the cellular phone 1, and the third party is going to start the execution of the data delivery between the cellular phone 1 and IC reader/writer (not shown) using the contactless IC chip 49. In this case, when, after the last execution of the data delivery between the cellular phone 1 and IC reader/writer (not shown) using the contactless IC chip 49 of the cellular phone 1 by the user (for example, after the execution of a settlement processing), the cellular phone 1 has been unused for a previously set given period (for example, two days), unless the third party (such as the finder of the cellular phone 1) inputs the correct password on the password input accept screen, it is possible to prevent the execution of the data delivery between the cellular phone 1 and IC reader/writer (not shown).

Therefore, when the user loses the cellular phone 1 with a built-in contactless IC chip 49, it is possible to properly prevent the third party (such as the finder of the cellular phone 1) from using the cellular phone illegally. As a result of this, the safety of the cellular phone 1 with a built-in contactless IC chip 49 can be enhanced when the contactless 1C chip 49 is used.

On the other hand, in the step S41, when it is judged that, after the last execution of the data delivery between the cellular phone 1 and IC reader/writer (not shown) using the contactless IC chip 49 of the cellular phone 1 by the user (for example, after the execution of a settlement processing), the cellular phone 1 has not been unused for a previously set given period (for example, two days), the processing goes to a step S47; and, in the step S47, the data delivery between the cellular phone 1 and IC reader/writer (not shown) using the contactless IC chip 49 of the cellular phone 1 is executed.

Thanks to this, suppose the user has not lost the cellular phone 1 with a built-in contactless IC chip 49, when a previously set given period (for example, two days) has not passed after the last execution of the data delivery between the cellular phone 1 and IC reader/writer (not shown) using the contactless IC chip 49 of the cellular phone 1 by the user (for example, after the execution of a settlement processing), the execution of the data delivery between the cellular phone 1 and IC reader/writer (not shown) can be started again without enforcing the password input processing and authentication processing. This can enhance the convenience of the cellular phone 1 when the contactless IC chip 49 incorporated in the cellular phone 1 is used.

By the way, the above-embodiment can also apply to a PDA (Personal Digital Assistant), a personal computer and other information processing apparatus, besides the cellular phone 1.

Also, a series of processings described hereinabove in the embodiment can be executed not only by software but also by hardware.

Further, in the embodiment, there has been shown an example in which the processings to be executed in the respective steps of the flow charts are executed in a time series manner along the order described. However, the invention is not limited to the processings to be executed in time series manner but it further includes processings which are executed in a parallel manner or in an individual manner.

DESIGNATION OF DOCUMENT

Drawings

[FIG. 1]
a. Memory/Clear
b. Power supply
c. * symbol
[FIG. 3]
a. To respective parts
14: Operation keys 20: CCD camera
47: Memory part 32: Power circuit part
31: Main control part
33: Operation input control part
34: Image encoder 35: Camera interface part
48: Music control part 48: Contactless IC chip
36: LCD control part 37: Image decoder
38: Multiple separation part
45: Record-reproduce part
39: Modulation demodulation circuit part
40: Voice codec 17: Liquid crystal display
21: Sub display 46: Memory card
43: Transmit-receive circuit part
15: Microphone 18: Speaker
[FIG. 4]
a. Start password input accept processing.
S1: If cellular phone is in a state where remote lock operation is impossible?
S2: Display password input accept screen.
S3: If cancellation of password input processing is instructed?
S4: Prohibit execution of delivery of data between cellular phone and IC reader/writer.
S5: Accept input of password.
S6: If input-accepted password is coincident with previously stored password?
S7: Start execution of delivery of data between cellular phone and IC reader/writer.
S8: Execute error processing.
b. End
[FIG. 5]
53: Password input accept screen
54: Input password.
56: Cancel
[C] Passwords are not coincident with each other.
[FIG. 6]
a. Start password input accept processing.
S11: If previously set given password input accept cycle has passed after execution of delivery of data between cellular phone and IC reader/writer?
S12: Display password input accept screen.
S13: If cancellation of password input processing is instructed?
S14: Prohibit execution of delivery of data between cellular phone and IC reader/writer.
S15: Accept input of password.
S16: If input-accepted password is coincident with previously stored password?
S17: Start execution of delivery of data between cellular phone and IC reader/writer.
S18: Execute error processing.
b. End
[FIG. 7]
a. Start password input accept cycle set processing.
S21: If start to execute password input accept cycle set processing is instructed?
S22: Accept input of password input accept cycle.
S23: Set password input accept cycle.
S24: Store set password input accept cycle set data.
End
[FIG. 8]
a. Start password input accept processing.
S41: If cellular phone has been unused for previously set period after execution of delivery of data between cellular phone and IC reader/writer?
S42: Display password input accept screen.
S43: If cancellation of password input processing is instructed?
S44: Prohibit execution of delivery of data between cellular phone and IC reader/writer.
S45: Accept input of password.
S46: If input-accepted password is coincident with previously stored password?
S47: Start execution of delivery of data between cellular phone and IC reader/writer.
S48: Execute error processing.
End

What is claimed is:

1. A mobile terminal comprising:
a wireless communication unit for communicating with a network;
a short-range communication unit, included in a contactless IC module, for communicating with an external device, which is an IC reader/writer and is disposed in a vicinity of the mobile terminal;
an input unit for inputting authentication information;
a memory unit for storing the authentication information; and
a control unit which detects whether or not a wireless communication via the wireless communication unit is executable, wherein the control unit is configured to urge a user to input authentication information when the control unit detects that the wireless communication is not executable, and then prohibit communication of the short-range communication unit with the external device if the input authentication information does not coincide with the authentication information stored in the memory unit.

2. The mobile terminal according to claim 1, wherein the control unit is configured to allow communication of the short-range communication unit with the external device if the input authentication information coincides with the authentication information stored in the memory unit.

3. The mobile terminal according to claim 1, wherein the mobile terminal communicates with a base station via the wireless communication unit.

4. A mobile terminal comprising:
a wireless communication unit for communicating with a network;
an input unit for inputting authentication information;
a memory unit for storing the authentication information;
a short-range communication unit, included in a contactless IC module, for communicating with an external device, which is an IC reader/writer and is disposed in a vicinity of the mobile terminal; and
a control unit which judges whether or not a predetermined time has elapsed since a previous communication via the short-range communication unit ended, wherein the control unit is configured to urge a user to input authentication information when the control unit judges that the predetermined time has elapsed, and then prohibit communication of the short-range communication unit with the external device if the input authentication information does not coincide with the authentication information stored in the memory unit.

5. The mobile terminal according to claim 4, wherein the control unit does not urge the user to input the authentication information if the predetermined time has not elapsed since the previous communication via the short-range communication unit ended.

6. A mobile terminal comprising:

a wireless communication unit for communicating with a network;

an input unit for inputting authentication information;

a memory unit for storing the authentication information;

a short-range communication unit, included in a contactless IC module, which is configured to communicate with an external device, which is an IC reader/writer and is disposed in a vicinity of the mobile terminal; and a control unit which judges whether or not the mobile terminal has been unused for a predetermined time period, wherein the control unit is configured to urge a user to input authentication information when the control unit judges that the mobile terminal has been unused for the predetermined time period, and then prohibit communication of the short-range communication unit with the external device if the input authentication information does not coincide with the authentication information stored in the memory unit.

\* \* \* \* \*